(12) United States Patent
Tsujimoto

(10) Patent No.: US 6,334,502 B1
(45) Date of Patent: Jan. 1, 2002

(54) POWER STEERING APPARATUS

(75) Inventor: Taisuke Tsujimoto, Kashiwara (JP)

(73) Assignee: Koyo Seiko Co., LTD, Osaka (JP)

( * ) Notice: Subject to any disclaimer, the term of this patent is extended or adjusted under 35 U.S.C. 154(b) by 0 days.

(21) Appl. No.: 09/540,522

(22) Filed: Mar. 31, 2000

(30) Foreign Application Priority Data

Apr. 7, 1999  (JP) ............................... 11-100408

(51) Int. Cl.$^7$ ................................................ B62D 5/99
(52) U.S. Cl. ........................................ 180/446; 701/41
(58) Field of Search ............................... 180/446, 421, 180/422; 701/41

(56) References Cited

U.S. PATENT DOCUMENTS

| | | | | |
|---|---|---|---|---|
| 4,771,843 A | * | 9/1988 | Shimizu | 180/79.1 |
| 4,869,334 A | * | 9/1989 | Marumoto et al. | 180/79.1 |
| 4,934,473 A | * | 6/1990 | Fushimi et al. | 180/79.1 |
| 4,977,507 A | * | 12/1990 | Matsuoka | 364/424.05 |
| 5,029,660 A | * | 7/1991 | Raad et al. | 180/143 |
| 5,313,389 A | * | 5/1994 | Yasui | 364/424.05 |
| 5,908,457 A | * | 6/1999 | Higashira et al. | 701/41 |
| 6,012,541 A | * | 1/2000 | Nishioka et al. | 180/404 |
| 6,250,418 B1 | * | 6/2001 | Shimizu et al. | 180/422 |

* cited by examiner

*Primary Examiner*—J. J. Swann
*Assistant Examiner*—L. Lum
(74) *Attorney, Agent, or Firm*—Rabine Berdo, P.C.

(57) ABSTRACT

Disclosed is a power steering apparatus using an electric motor as a drive source. The power steering apparatus includes a drive inhibiting circuit for inhibiting an electric motor from being driven when the temperature detected by a temperature sensor is not less than an upper-limit temperature, a judging circuit for judging, in a state where the electric motor is inhibited from being driven by the drive inhibiting circuit, whether or not the steering angle is included in a predetermined steering angle midpoint range when the temperature sensor detects a temperature which is not more than a lower-limit temperature, and a re-drive allowing circuit for allowing, when it is judged that the steering angle is within the steering angle midpoint range, the electric motor to be driven again.

13 Claims, 3 Drawing Sheets

POWER STEERING APPARATUS

BACKGROUND OF THE INVENTION

1. Field of the Invention

The present invention relates to power steering apparatuses for applying a steering assist force to a steering mechanism by hydraulic pressure created by a pump driven by an electric motor.

2. Description of Related Art

Conventionally, power steering apparatuses for assisting in operating a steering wheel by supplying working oil from an oil pump to a power cylinder coupled to a steering mechanism have been employed. In such power steering apparatuses, the oil pump is driven by an electric motor. A steering assist force corresponding to the rotational speed of the electric motor is produced from the power cylinder.

Drive control of the electric motor is achieved by an electronic control unit carrying out on-off control of a motor driving element composed of an FET (Field Effect Transistor). In some circumstances, the steering wheel continues to be violently operated, so that the motor driving element is frequently turned on and off. There are also circumstances that the load on the electric motor is increased, resulting in a large current flow in the motor. In these situations, the motor driving element generates heat. Accordingly, the motor driving element may be destroyed.

The electronic control unit is constituted by a computer including a CPU, a RAM, and a ROM, for example, and has low resistance to heat applied from the exterior. When the motor driving element generates heat because the steering wheel continues to be violently operated, therefore, the electronic control unit may be destroyed by the heat generation from the motor driving element.

In the conventional power steering apparatus, therefore, there is provided a temperature sensor for detecting the internal temperature of the electronic control unit, for example. If the temperature detected by the temperature sensor is higher than a predetermined temperature, the electronic motor is forced to be stopped. After the temperature detected by the temperature sensor is lowered to not more than the predetermined temperature, the electronic motor which has been forced to be stopped is restarted. Consequently, the motor driving element and the electronic control unit can be prevented from being destroyed by the heat generation.

In the above-mentioned conventional control, however, after the electric motor is forced to be strropped, a driver may have a feeling of physical disorder in steering when the internal temperature of the electronic control unit is lowered to not more than the predetermined temperature while the steering wheel is being operated. That is, in a case where the driver is applying torque to the steering wheel, when the internal temperature of the electronic control unit is lowered to not more than the predetermined temperature, the electric motor is restarted in response thereto, thereby suddenly assisting in steering the steering wheel. Accordingly, the driver feels that the steering resistance is rapidly lowered.

SUMMARY OF THE INVENTION

An object of the present invention is to provide a power steering apparatus capable of preventing a driver from having a feeling of physical disorder in steering.

A power steering apparatus according to the present invention uses an electric motor as a drive source, and produces a steering assist force for assisting in steering by oil pressure created by a pump driven by the electric motor, for example. The apparatus comprises a temperature detection section for detecting the temperature in a predetermined portion; a steering angle detection section for outputting steering angle data corresponding to a steering angle; a drive inhibiting circuit for inhibiting the electric motor from being driven when the temperature detected by the temperature detection section is not less than a predetermined upper-limit temperature; a judging circuit for judging, in a state where the electric motor is inhibited from being driven by the drive inhibiting circuit, whether or not the steering angle is included in a predetermined steering angle midpoint range on the basis of the steering angle data from the steering angle detection section when the temperature detected by the temperature detection section is lowered to not more than a predetermined lower-limit temperature; and a re-drive allowing circuit for allowing, when the judging circuit judges that the steering angle is within the steering angle midpoint range, the electric motor to be driven again.

According to the present invention, when the temperature detected by the temperature detection section is not less than the predetermined upper-limit temperature, the electric motor is inhibited from being driven by the drive inhibiting circuit. When the temperature detected by the temperature detection section is lowered to not more than the predetermined lower-limit temperature in a state where the motor is inhibited from being driven, it is judged whether or not the steering, angle is within the steering, angle midpoint range. The electric motor is allowed to be driven again by the re-drive allowing circuit, provided that the steering angle is within the steering angle midpoint range.

Consequently, the assistance in steering is prevented from being suddenly started while a driver is performing a steering operation, thereby making it possible to prevent the driver from having such a feeling of physical disorder in steering that the steering resistance is rapidly lowered.

The steering angle midpoint range is a predetermined range including a steering angle midpoint, which is a steering angle in a case where a vehicle goes straight on.

Furthermore, it is preferable that the predetermined portion is the inside of a control unit for controlling the drive of the electric motor. The predetermined portion may be a motor driving element such as an FET for controlling the supply of power to the electric motor.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
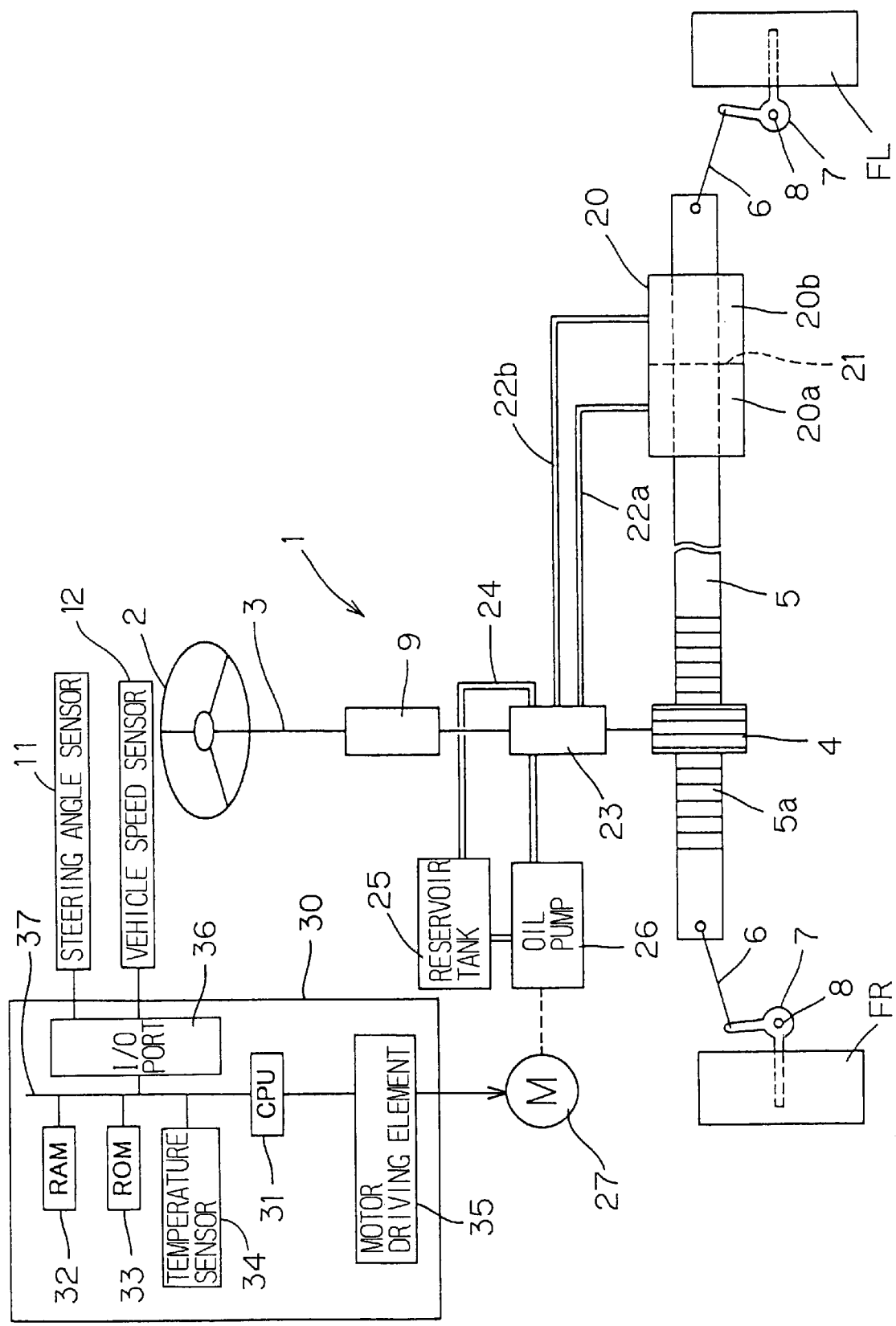
FIG. 1 is a conceptual diagram showing the basic configuration of a power steering apparatus according to an embodiment of the present invention.

FIG. 1 is a conceptual diagram showing the basic configuration of a power steering apparatus according to an embodiment of the present invention. The power steering apparatus is provided in relation to a steering mechanism 1 of a vehicle, and is for applying a steering assist force to the steering mechanism 1.

The steering mechanism 1 comprises a steering wheel 2 operated by a driver, a steering shaft 3 connected to the steering wheel 2, a pinion gear 4 provided at a front end of the steering shaft 3, and a rack shaft 5. The rack shaft 5 has a rack gear portion 5a extending along the width of the vehicle and engaged with the pinion gear 4. Tie rods 6 are respectively coupled to both ends of the rack shaft 5. The tie rods 6 are respectively coupled to knuckle arms 7 for supporting right and left front wheels FR and FL serving as steering wheels. The knuckle arm 7 is provided so as to be rotatable around a king pin 8.

By this configuration, when the steering wheel 2 is operated so that the steering shaft 3 is rotated, the rotation is converted into a linear motion along the width of the vehicle by the pinion gear 4 and the rack shaft 5. The linear motion is converted into rotation of the knuckle arms 7 around the king pins 8, thereby achieving the steering of the right and left front wheels FR and FL.

In a halfway portion of the steering shaft 3, there are interposed a torsion bar 9, which is distorted depending on the direction and the magnitude of steering torque applied to the steering wheel 2, and an hydraulic pressure control valve 23, which changes its valve aperture depending on the direction and the magnitude of the distortion of the torsion bar 9. The hydraulic pressure control valve 23 is connected to a power cylinder 20 for applying a steering assist force to the steering mechanism 1. The power cylinder 20 has a piston 21 provided integrally with the rack shaft 5 and a pair of cylinder chambers 20a and 20b, which are defined by the piston 21. The cylinder chambers 20a and 20b are connected to the hydraulic pressure control valve 23, respectively, through oil supply/return lines 22a and 22b.

The hydraulic pressure control valve 23 is further interposed in a halfway portion of an oil circulation line 24 passing through a reservoir tank and an oil pump 26. The oil pump 26 is driven by an electric motor 27, to draw working oil stored in the reservoir tank 25 and supply the drawn working oil to the hydraulic pressure control valve 23. The excess working oil is returned to the reservoir tank 25 from the hydraulic pressure control valve 23 through the oil circulation line 24.

The hydraulic pressure control valve 23 supplies, when the torsion bar 9 is distorted in one direction, the working oil to one of the cylinder chambers 20a and 20b in the power cylinder 20 through one of the oil supply/return lines 22a and 22b, while supplying, when the torsion bar 9 is distorted in the other direction, the working oil to the other cylinder chamber through the other oil supply/return line. When the torsion bar 9 is not virtually distorted, the hydraulic pressure control valve 23 enters a so-called equilibrium state. Accordingly, the working oil circulates in the oil circulation line 24 without being supplied to the power cylinder 20.

When the working oil is supplied to either one of the cylinder chambers in the power cylinder 20, the piston 21 moves along the width of the vehicle.

Consequently, a steering assist force is exerted on the rack shaft 5.

Drive control of the motor 27 is achieved by a CPU 31 in an electronic control unit carrying out on-off control of a motor driving element 35 composed of an FET, for example. The electronic control unit 30 comprises a RAM 32, a ROM 33 and a temperature sensor 34, which are connected to the CPU 31 through a bus 37. The RAM 32 provides a work area for the CPU 31. The ROM 33 stores an operation program of the CPU 31, and the like. The temperature sensor 34 is provided inside the electronic control unit 30, to detect the internal temperature of the electronic control unit 30.

Steering angle data outputted from a steering angle sensor 11 is fed to the CPU 31 through an I/O (Input/Output) port 36 connected to the bus 37. The steering angle sensor 11 is provided in relation to the steering wheel 2, and outputs steering angle data corresponding to a relative steering angle from an initial value, taking a steering angle of the steering wheel 2 when an ignition key switch of the vehicle is turned on to start the engine as the initial value "0".

Furthermore, an output signal of a vehicle speed sensor 12 for detecting the speed of the vehicle is fed to the CPU 31 through the I/O port 36. The vehicle speed sensor 12 may directly detect the speed of the vehicle, or may find the speed of the vehicle by calculation on the basis of pulses outputted from wheel speed sensors provided in relation to the wheels.

The CPU 31 finds a steering angle speed on the basis of the steering angle data fed from the steering angle sensor 11. The drive of the motor 27 is controlled on the basis of the steering angle speed found from the steering angle data, the vehicle speed detected by the vehicle speed sensor 12, and the temperature detected by the temperature sensor 34.

Figure 2:
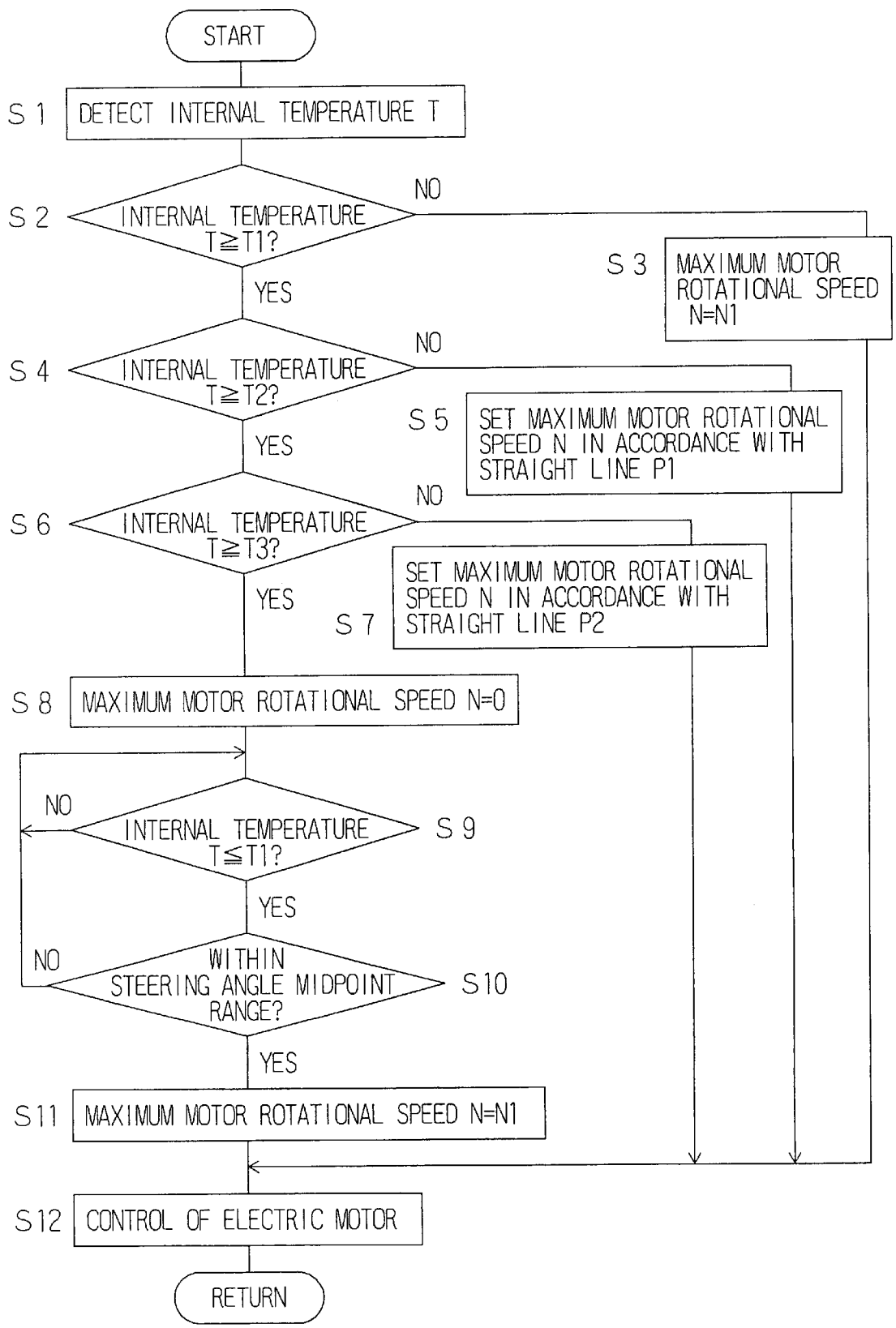
FIG. 2 is a flow chart for explaining operations performed by a CPU in relation to the drive of an electric motor.
Figure 3:
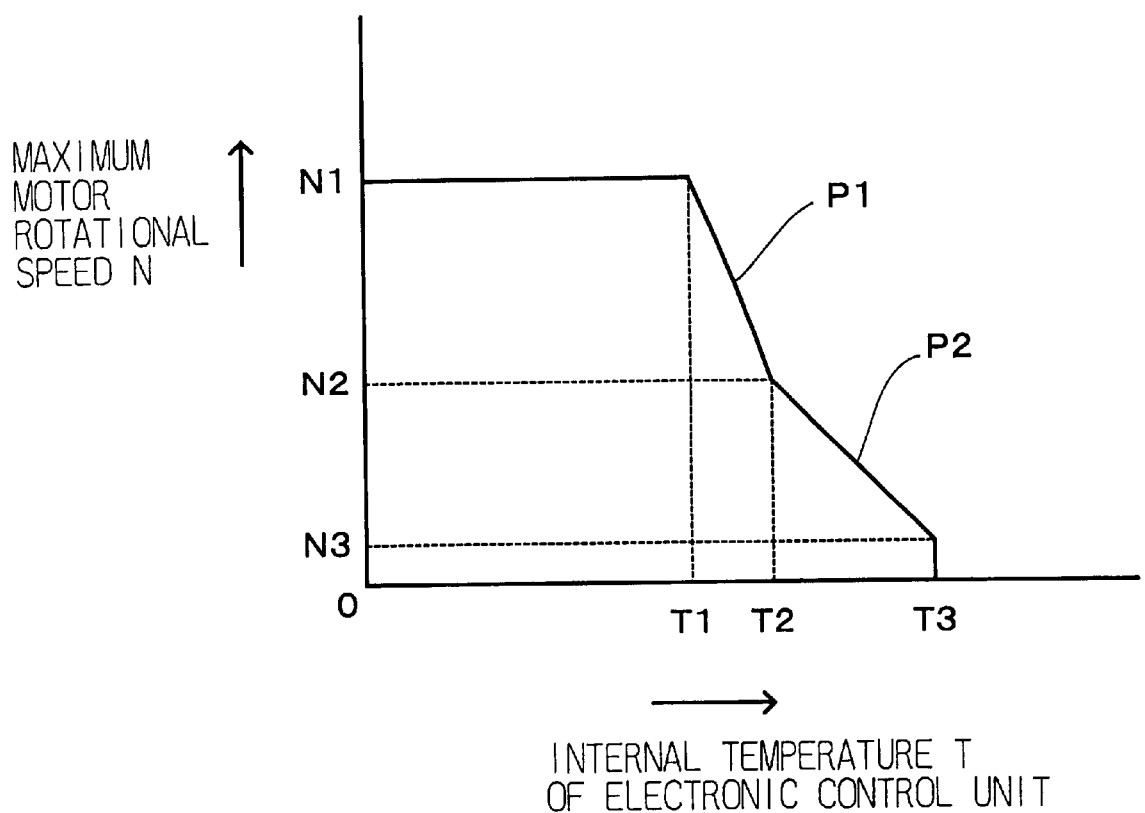
FIG. 3 is a graph showing the relationship between the internal temperature of an electronic control unit and the maximum motor rotational speed of the electric motor.

FIG. 2 is a flow chart for explaining operations performed by the CPU 31 in relation to the drive of the electric motor 27. FIG. 3 is a graph showing the relationship between the internal temperature T of the electronic control unit 30, which is detected by the temperature sensor 34, and the maximum motor rotational speed N of the electric motor 27.

The CPU 31 in the electronic control unit 30 first refers, when the ignition key switch of the vehicle is turned on, to an output signal of the temperature sensor 34, to detect the internal temperature T of the electronic control unit 30 (step S1). It is judged whether or not the detected internal temperature T is not less than a first threshold temperature T1 previously determined (for example, 105° C.) (step S2). If the internal temperature T is less than the first threshold temperature T1 (NO at step S2), the maximum motor rotational speed N of the electric motor 27 is set to a first rotational speed N1 previously determined (step S3).

When the internal temperature T is not less than the first threshold temperature T1, it is then judged whether or not the internal temperature T is not less than a second threshold temperature T2 (for example, 110° C.) higher than the first threshold temperature T2 (step S4). When the internal temperature T is less than the second threshold temperature T2, that is, the internal temperature T is not less than the first threshold temperature T1 and is less than the second threshold temperature T2, the maximum motor rotational speed N is set in accordance with a straight line P1 (see FIG. 3), which changes almost linearly between the first rotational speed N1 and the second rotational speed N2 (N1>N2) with respect to the internal temperature T (step S5).

When the internal temperature T is not less than the second threshold temperature T2, the CPU 31 judges whether or not the internal temperature T is not less than a third threshold temperature T3 (for example, 12° C.) higher than the second threshold temperature T2 (step S6). When the internal temperature F is less than the third threshold temperature T3, that is, the internal temperature T is not less than the second threshold temperature T2 and is less than the third threshold temperature T3, the maximum motor rotational speed N is set in accordance with a straight line P2 (see FIG. 3), which changes almost linearly between the second rotational speed N2 and the third rotational speed N3 (N2>N3) with respect to the internal temperature T (step S7).

When the maximum motor rotational speed N of the electric motor 27 corresponding to the internal temperature T of the electronic control unit 30 is thus determined, the CPU 31 reads out a motor control map corresponding to the vehicle speed at that time from the ROM 33 on the basis of the output signal from the vehicle speed sensor 12. The motor control map is referred to in order for the CPU 31 to set a suitable target motor rotational speed corresponding to the steering angle speed, and is provided for each of a plurality of vehicle speed ranges previously determined (for example, a low speed range, an intermediate speed range, and a high speed-range) such that a good steering feeling can be realized. The CPU 31 refers to the motor control map read out of the ROM 33, to control the drive of the electric motor 27 within the range of the maximum motor rotational speed N set at the steps S3, S5, and S7 on the basis of the steering angle speed found from the steering angle data outputted by the steering angle sensor 11 (step S12).

In the present embodiment, so-called idle-and-go control is carried out such that the electric motor 27 is rotated at a predetermined low rotational speed in a straight steering state where the steering wheel 2 is not turned, while the rotational speed of the electric motor 27 is increased to a rotational speed corresponding to the steering angle speed when the steering wheel 2 is turned.

On the other hand, when the internal temperature T is not less than the third threshold temperature T3, the CPU 31 sets the maximum motor rotational speed N to zero (step S8). When the internal temperature T of the electronic control unit 30 is not less than the third threshold temperature T3 while the electric motor 27 is being driven, for example, the electric motor 27 during the driving is forced to be stopped. In the present embodiment, the processing at the step S8 corresponds to the function of a drive inhibiting circuit.

The CPU 31 sets the maximum motor rotational speed N to zero, and then always monitors an output of the temperature sensor 34, to repeatedly judge whether or not the internal temperature T of the electronic control unit 30 is lowered to less than the first threshold temperature T1 (step S9). If the internal temperature T of the electronic control unit 30 becomes less than the first threshold temperature T1, it is judged whether or not the steering angle of the steering wheel 2 is within a steering angle midpoint range (for example, −5 to +5°) with reference to the steering angle data fed from the steering angle sensor 11 (step S10).

The steering angle midpoint is a steering angle of the steering wheel 2 in a case where the vehicle goes straight on. For example, the electronic control unit 30 samples the steering angle data outputted from the steering angle sensor 11 after the ignition key switch of the vehicle is turned on, to prepare a histogram of steering angle data values. The electronic control unit 30 finds, after steering angle data corresponding to a predetermined number of times of sampling are collected, the most frequent steering angle data, takes the most frequent steering angle data as steering angle data at a steering angle midpoint, and sets a predetermined range including the data as a steering angle midpoint range. The steering angle midpoint range thus set is stored in the RAM 32 contained in the electronic control unit 30. The electronic control unit 30 judges whether or not the steering angle data from the steering angle sensor 11 is data within the steering angle midpoint range that is held in the RAM 32.

When the steering angle of the steering wheel 2 is not within the steering angle midpoint range it is repeatedly examined whether or not the internal temperature T of the electronic control unit 30 is less than the first threshold temperature, and the steering angle of the steering, wheel 2 is within the steering angle midpoint range until the steering angle of the steering wheel 2 is returned to the steering angle midpoint range. When the steering angle of the steering wheel 2 is returned to the steering angle midpoint range and it is judged that the steering angle of the steering wheel 2 is within the steering angle midpoint range (YES at step S10), the maximum motor rotational speed N of the electric motor 27 is set to the first rotational speed N1 (step S11), and the drive control of the electric motor 27 is resumed (step S12). Specifically, when the idle-and-go control is carried out as in the present embodiment, the electric motor 27, which is being stopped, is restarted, to rotate the electric motor 27 at the predetermined low rotational speed. When the drive control of the electric motor 27 is started or resumed, the processing is returned. In the present embodiment the processing at the step S10 corresponds to the function of the judging circuit, and the processing at the step S11 corresponds to the function of the re-drive allowing circuit.

As described in the foregoing, according to the present embodiment, when the internal temperature T of the electronic control unit 30 is not less than the third threshold temperature T3, the drive of the electric motor 27 is stopped. Thereafter, when the internal temperature T of the electric control unit 30 is lowered to less than the first threshold temperature T1, it is judged whether or not the steering angle of the steering wheel 2 is within a predetermined steering angle midpoint range. The drive of the electric motor 27, which is being stopped, is resumed, provided that the steering angle of the steering wheel 2 is within the steering angle midpoint range. Consequently, it is possible to prevent sudden assistance in steering the steering wheel 2 from being provided while the driver is operating the steering wheel 2, thereby making it possible to prevent the driver from having such a feeling of physical disorder in steering that the steering wheel 2 is rapidly lightened.

Although description has been made of an embodiment of the present invention, the present invention is not limited to the above-mentioned embodiment. For example, although in the above-mentioned embodiment, so-called idle-and-go control is carried out such that the electric motor 27 is rotated at a predetermined low rotational speed even in a straight steering state where the steering wheel 2 is not turned, so-called stop-and-go control may be carried out such that the electric motor 27 is stopped in a straight steering state and is started, when the steering wheel 2 is steered at not less than a predetermined steering angle speed, in response thereto. When the stop-and-go control is carried out, the electric motor 27 may be restarted, when the steering wheel 2 is steered after the internal temperature T of the electronic control unit 30 is lowered to less than the first threshold temperature T1, and it is judged once that the steering angle of the steering wheel 2 is within the predetermined steering angle midpoint range, in response thereto.

Although in the above-mentioned embodiment, the temperature sensor 34 is provided inside the electronic control unit 30, and the maximum motor rotational speed N of the electric motor 27 is determined on the basis of the internal temperature T of the electronic control unit 30, the temperature sensor 34 may be provided in relation to the motor driving element 35, for example, to determine the maximum motor rotational speed N of the electric motor 27 on the basis of the temperature of the motor driving element 35 which is detected by the temperature sensor 34. Further, the temperature sensor 34 may be provided in relation to the electric motor 27, to carry out an electric motor control similar to that in the above-mentioned embodiment.

Although the present invention has been described and illustrated in detail, it is clearly understood that the same is by way of illustration and example only and is not to be taken by way of limitation, the spirit and scope of the present invention being limited only by the terms of the appended claims.

The present invention claims priority benefits under 35 § 119 of Japanese Patent Application No. 11-100408 filed with the Japanese Patent Office on Apr. 7, 1999, the disclosure of which is incorporated hereinto by reference.

What is claimed is:

1. A power steering apparatus using an electric motor as a drive source, comprising:

a temperature detection section for detecting a temperature in a predetermined portion;

a steering angle detection section for outputting steering angle data corresponding to a steering angle;

a drive inhibiting circuit for inhibiting the electric motor from being driven when the temperature detected by the temperature detection section is not less than a predetermined upper-limit temperature;

a judging circuit for judging, in a state where the electric motor is inhibited from being driven by the drive inhibiting circuit, whether or not the steering angle is included in a predetermined steering angle midpoint range on the basis of the steering angle data from the steering angle detection section when the temperature detected by the temperature detection section is lowered to not more than a predetermined lower-limit temperature; and a re-drive allowing circuit for allowing, when the judging circuit judges that the steering angle is within the steering angle midpoint range, the electric motor to be driven again.

2. The power steering apparatus according to claim 1, wherein
   the power steering apparatus produces a steering assist force for assisting in steering by oil pressure created by a pump driven by the electric motor.

3. The power steering apparatus according to claim 1, wherein
   the predetermined portion is a portion in which the temperature changes depending on how the electric motor is energized.

4. The power steering apparatus according to claim 1, wherein
   the predetermined portion is the inside of a control unit for controlling the drive of the electric motor.

5. The power steering apparatus according to claim 1, further comprising
   a maximum motor rotational speed setting circuit for controlling, when the temperature detected by the temperature detection section takes an intermediate value between the upper-limit temperature and the lower-limit temperature, the maximum rotational speed of the electric motor to an intermediate rotational speed between a predetermined maximum value and a predetermined minimum value depending on the detected temperature.

6. A system for controlling an electric motor in a power steering apparatus for a vehicle, the comprising:

means for providing steering angle data corresponding to a steering angle of the vehicle; and a control unit controlling operation of the electric motor, including means for detecting a temperature of the control unit, means for driving the electric motor, means, responsive to detection by the temperature detecting means of a control unit temperature not less than a predetermined upper-limit temperature value, for inhibiting the driving means from driving the electric motor, means, responsive to detection by the temperature detecting means of a reduction in the control unit temperature to not more than a predetermined lower-limit temperature value, while the inhibiting means is inhibiting the driving, means from driving the electric motor, for judging whether or not the steering angle is included in a predetermined steering angle midpoint range on the basis of the steering angle data provided by the steering angle data providing means, and means, responsive to a judgment by the judging means that the steering angle is within the steering angle midpoint range, for discontinuing the inhibiting of the driving means by the inhibiting means.

7. The system according to claim 6, wherein the power steering apparatus produces a steering assist force for assisting in steering by oil pressure created by a pump driven by the electric motor.

8. The system according to claim 6, wherein the temperature in the control unit changes depending on how the electric motor is energized.

9. The system according to claim 6, further comprising means for controlling the maximum rotational speed of the electric motor to an intermediate rotational speed between a predetermined maximum value and a predetermined minimum value depending on the detected temperature, when the temperature detected by the temperature detecting means takes an intermediate value between the upper-limit temperature value and the lower-limit temperature value.

10. A power steering system for a vehicles the comprising:

a hydraulic pump for providing a steering assist force for assisting in steering of the vehicle;

an electric motor for driving the pump;

means for providing steering angle data corresponding to a steering angle of the vehicle; and a control unit controlling operation of the electric motor, including means for detecting a temperature of the control unit that changes depending on how the electric motor is energized, means for driving the electric motor, means, responsive to detection by the temperature detecting means of a control unit temperature not less than a predetermined upper-limit temperature value, for inhibiting the driving means from driving the electric motor, means, responsive to detection by the temperature detecting means of a reduction in the control unit temperature to not more than a predetermined lower-limit temperature value, while the inhibiting means is inhibiting the driving means from driving the electric motor, for judging whether or not the steering angle is included in a predetermined steering angle midpoint range on the basis of the steering angle data provided by the steering angle data providing means, and means, responsive to a judgment by the judging means that the steering angle is within the steering angle midpoint range, for discontinuing the inhibiting of the driving means by the inhibiting means.

11. The system according to claim 10, further comprising means for controlling the maximum rotational speed of the electric motor to an intermediate rotational speed between a predetermined maximum value and a predetermined minimum value depending on the detected temperature, when the temperature detected by the temperature detecting means takes an intermediate value between the upper-limit temperature value and the lower-limit temperature value.

12. A system for controlling an electric motor in a power steering apparatus for a vehicle, the comprising;

means for providing steering angle data corresponding to a steering angle of the vehicle; and a control unit controlling operation of the electric motor, including
means for detecting a temperature of the control unit,
means for driving the electric motor,
means, responsive to detection by the temperature detecting means of a control unit temperature not less than a predetermined upper-limit temperature value, for inhibiting the driving means from driving the electric motor,
means, responsive to detection by the temperature detecting means of a reduction in the control unit temperature to not more than a predetermined lower-limit temperature value, while the inhibiting means is inhibiting the driving means from driving the electric motor, for judging whether or not the steering angle is included in a predetermined steering angle midpoint range on the basis of the steering angle data provided by the steering angle data providing means, and
means, responsive to a judgment by the judging means that the steering angle is within the steering angle midpoint range while the inhibiting means is inhibiting the driving means from driving the electric motor, for discontinuing the inhibiting of the driving means by the inhibiting means, the inhibiting means, once responding to the detection of a control unit temperature not less than a predetermined upper-limit temperature value to inhibit the driving, means from driving the electric motor, continuing to inhibit the driving means from driving the electric motor until the discontinuing means responds to the judgment by the judging means to discontinue the inhibiting.

13. The system according to claim 12, further comprising means for controlling the maximum rotational speed of the electric motor to an intermediate rotational speed between a predetermined maximum value and a predetermined minimum value depending on the detected temperature when the temperature detected by the temperature detecting means takes an intermediate value between the upper-limit temperature value and the lower-limit temperature value.

* * * * *